(12) United States Patent
Higuma (10) Patent No.: US 7,467,900 B2
(45) Date of Patent: Dec. 23, 2008

(54) CAMERA BODY, INTERCHANGEABLE LENS, AND CAMERA SYSTEM

(75) Inventor: Kazuya Higuma, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 11/337,150

(22) Filed: Jan. 19, 2006

(65) Prior Publication Data

US 2006/0171707 A1 Aug. 3, 2006

(30) Foreign Application Priority Data

Jan. 28, 2005 (JP) ............................. 2005-020618

(51) Int. Cl.
G03B 17/00 (2006.01)
(52) U.S. Cl. ..................................... 396/529
(58) Field of Classification Search ................... 396/52, 396/55, 89, 104, 147, 281, 287, 257, 529, 396/305; 348/360, 362–366, 231.6
See application file for complete search history.

(56) References Cited

U.S. PATENT DOCUMENTS 5,481,326 A * 1/1996 Yasukawa .................... 396/529
5,687,399 A * 11/1997 Kai et al. ..................... 396/55
5,822,632 A * 10/1998 Miyazawa et al. .......... 396/529
6,845,218 B2 * 1/2005 Miyasaka et al. ........... 396/301
2002/0012539 A1 * 1/2002 Sato et al. ................... 396/529
2005/0099509 A1 * 5/2005 Kobayashi ................ 348/229.1

FOREIGN PATENT DOCUMENTS

JP 11-084445 A 3/1999

* cited by examiner

Primary Examiner—W. B. Perkey
Assistant Examiner—Minh Phan
(74) Attorney, Agent, or Firm—Canon U.S.A., Inc, IP Division (57) ABSTRACT

At least one exemplary embodiment is directed to an interchangeable lens that can be connected to a new type camera and also to an old type camera, for example by requesting a release lock or not requesting a release lock, can be provided with a camera determination unit and a failure determination unit. Further, a camera body can be provided with an interchangeable lens determination unit, which can be set by a user so that an information request is ignored if an old type lens transmits a request for the release lock, where in the case of a new type lens, the camera body can perform a failure information communication with the lens, and an operation of the camera can be changed in accordance with the failure.

5 Claims, 8 Drawing Sheets

CAMERA BODY, INTERCHANGEABLE LENS, AND CAMERA SYSTEM

BACKGROUND OF THE INVENTION

1. Field of the Invention

The present invention relates to camera technologies and more particularly, although not exclusively, to technologies for camera bodies, interchangeable lens, and camera systems configured using such camera bodies and interchangeable lens.

2. Description of the Related Art

Conventionally several camera systems are known having communication to the camera body about an interchangeable lens.

For example, conventionally a camera system is known in which information about the interchangeable lens is transmitted to the camera body, which controls the interchangeable lens by sending and receiving a command for driving a focusing lens and a diaphragm of the interchangeable lens based on the transmitted information.

In these camera systems, it becomes impossible to continue a normal photographing operation in a case where a failure occurs in the interchangeable lens, as well as in the case of failure in the camera body.

In such a case, usually, a message indicating the failure is displayed and the camera operation is shifted to a photographing prohibition mode (release lock).

However, with respect to the failures related to the interchangeable lens, there are failures that adversely and critically affect the photographing as well as failures that affect the photographing to a relatively small degree.

In this regard, if the photographing is prohibited (release is locked) even in the case of the failure that affects the photographing to a relatively small degree, an opportunity for photographing a good scene is missed.

In order to solve the above problem, Japanese Patent Application Laid-Open No. 11-084445 discusses a camera that allows the photographing to continue without prohibiting the photographing (without the release lock) even when the failure occurs in an image stabilization system.

Further, Japanese Patent Application Laid-Open No. 11-084445 discusses a method for suppressing an image deterioration due to a camera shake to a minimum by changing an operation of the camera when the image stabilization system fails.

Japanese Patent Application Laid-Open No. 11-084445 describes that the release lock is not actuated when the image stabilization system fails.

However, the release lock is actuated in the case of other failures.

Besides, Japanese Patent Application Laid-Open No. 11-084445 does not refer to problems that occur in relation to the single-lens reflex camera system configured of the interchangeable lens and the camera body.

The camera system enables sending and receiving the information related to the failure in the interchangeable lens by defining a new communication command. However, some conventional camera bodies and interchangeable lens cannot deal with the new communication command.

Therefore, a demand has grown for the interchangeable lens that can operate without a failure even when it is combined with the camera body that cannot deal with the new communication command and also for the camera body that can operate without a failure even when it is combined with the interchangeable lens that cannot deal with the new communication command.

SUMMARY OF THE INVENTION

At least one exemplary embodiment is directed to an interchangeable lens that facilitates the continuation of photographing in a case where a failure occurs in the interchangeable lens, and which can be combined with a conventional camera body.

Further, at least one exemplary embodiment is directed to a camera system that includes a camera body that can be combined with a conventional interchangeable lens or a camera system that includes the interchangeable lens.

At least one further exemplary embodiment is directed to an interchangeable lens that facilitates continuation of photographing without actuating a release lock when a failure occurs to the interchangeable lens when combined with the camera body that cannot deal with a new communication command.

Further, at least one exemplary embodiment is directed to an interchangeable lens combined with a camera body that can deal with the new communication command. The interchangeable lens can communicate information on the failure to the camera body by a new communication command.

In addition, at least one exemplary embodiment is directed to a camera body that facilitates continuation of photographing without actuating the release lock when the camera body is combined with an interchangeable lens that cannot deal with the new communication command.

Further, at least one exemplary embodiment is directed to a camera body that is configured to receive information of a failure from the interchangeable lens using the new communication command when the camera body is combined with an interchangeable lens that can deal with the new communication command.

Further, at least one exemplary embodiment is directed to a camera system that facilitates a camera body to continue photographing in the case where a failure occurs in relation to an interchangeable lens and that is configured to suppress an influence on photographing which comes from the failure of the interchangeable lens to a minimum. In this case, an operation is carried out by the camera body in accordance with various kinds of the failure of the interchangeable lens.

In at least one exemplary embodiment, an interchangeable lens includes: a communication unit configured to communicate with a camera body; a camera determination unit configured to determine a type of a camera body based on information obtained through a communication with the camera body; a failure determination unit configured to detect a failure in the interchangeable lens and determine a kind of the detected failure; a failure information transmission unit configured to transmit failure information determined by the failure determination unit to the camera body; and a switching unit configured to perform switching as to whether the failure information should be transmitted, based on a result of the determination by the camera determination unit.

According to at least one exemplary embodiment, photographing can be continued in the case where the failure occurs in relation to the interchangeable lens, and thus an opportunity to shoot does not slip away.

Further, since a processing by the camera is changed according to the various kinds of failures; an adverse affect due to the failure can be suppressed to a minimum.

Further, a user can set conditions to prohibit or permit photographing in relation to each failure, and thus a suspension of photographing due to the failure in the interchangeable lens can be reduced.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention.

DETAILED DESCRIPTION OF THE EXEMPLARY EMBODIMENTS

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, certain circuitry for focus driving system, a diaphragm driving system, and others may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it can not be discussed for following figures.

Exemplary embodiments will be described in detail below with reference to the attached drawings.

Figure 1:
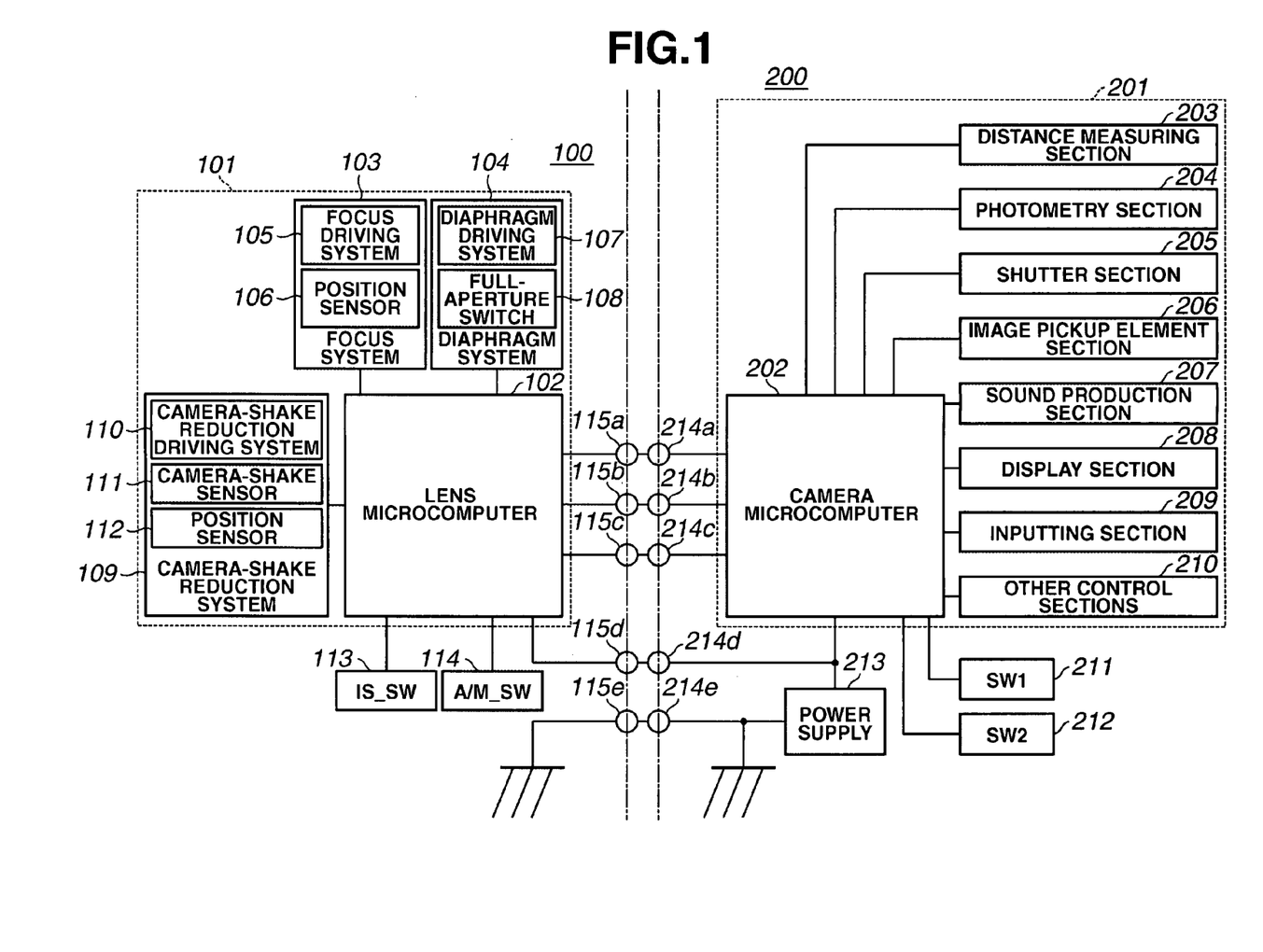
FIG. 1 is a block diagram showing an electrical structure of a camera system according to at least one exemplary embodiment.

FIG. 1 is a block diagram showing a configuration of a circuit of a single-lens reflex camera according to at least one exemplary embodiment.

In FIG. 1, reference numeral 100 denotes an interchangeable lens, and reference numeral 200 denotes a camera body. A lens microcomputer 102 communicates (e.g., as a communication unit) with the camera body 200 via contacts for communication 115a (e.g., for a clock signal), 115b (e.g., for transmission of a signal from the camera body to the lens), and 115c (e.g., for transmission of a signal from the lens to the camera body) The information from the camera body, e.g., via the communication unit, can be used by the lens microcomputer 102 (including a camera determination unit) to determine the camera body type (e.g., by comparing an ID with a saved table).

A camera-shake reduction system 109, a focus system 103, and a diaphragm drive system 104 configured as shown in FIG. 1 are operated in accordance with a command value of the lens microcomputer 102.

The camera-shake reduction system 109 initiates an arithmetic operation by the lens microcomputer 102 based on outputs from a camera-shake detecting sensor 111, and a position sensor 112 that detects a displacement of a camera-shake reduction lens.

A camera-shake reduction is carried out by driving a camera-shake reduction lens based on a result of the arithmetic operation.

Reference numeral 113 (IS_SW) denotes an image stabilization switch for selecting the camera-shake reduction. The image stabilization switch 113 (IS_SW) is turned on when performing the camera-shake reduction.

The focus system 103 includes a focus driving system 105 for driving a focus adjusting lens (not shown) and a position sensor 106 that detects a position of the focus adjusting lens. The focusing is performed by driving the focus adjusting lens in accordance with a command value from the lens microcomputer 102.

Reference numeral 114 (A/M_SW) denotes a switch for selecting a focusing operation. The switch 114 (A/M_SW) is set to AUTO when an automatic focus adjustment is performed.

The diaphragm drive system 104 includes a diaphragm driving system 107 for driving a diaphragm (not shown) and a full aperture switch 108 for detecting whether the aperture is fully open.

Stopping the diaphragm to a position that is set or restoring the diaphragm to a full-aperture state is operated in accordance with the command value from the lens microcomputer 102.

The lens microcomputer 102 transmits information related to a state inside the lens (a focus position, an aperture value) and information related to the lens (an aperture value, a focal distance, data necessary for measuring the distance), via the contact for communication.

An electrical system 101 of the lens includes the lens microcomputer 102, the focus system 103, the diaphragm drive system 104, and the camera-shake reduction system 109.

An in-camera power supply 213 provides the power to the electrical system 101 of the lens via a power supply contact 115d and a ground contact 115e.

The camera body 200 includes an electrical system 201 for the camera. The electrical system 201 includes a distance measuring section 203 for measuring a defocusing amount from an image pickup surface to a subject and a photometry section 204 for measuring an amount of light that passes through the interchangeable lens, In addition, the camera body 200 can include a shutter section 205 for performing an exposure of an image pickup element (e.g., a CMOS sensor) for a proper period of time, an image pickup element section 206, and a sound production section 207 for producing a warning sound.

Further, the camera body 200 can include a display section 208 that displays various kinds of information related to the camera body, an inputting section 209 for allowing a user to input a desired operation, and other control sections 210.

A camera microcomputer 202 can be installed that manages a start and a suspension of the operations and carries out arithmetic operations of the exposure, the distance measurement, and/or other camera functions.

The power is supplied to the electrical system 201 in the camera body from the in-camera power supply 213.

Reference numeral 211 (SW1) denotes a switch for starting the photometry and the distance measurement.

Reference numeral 212 (SW2) denotes a switch for starting shutter release.

Generally, the switches are of two-stage stroke type. That is, the switch 211 (SW1) is turned on by a first stroke of a release button, and the switch 212 (SW2) is turned on by a second stroke of the release button.

Further, in order to communicate with the interchangeable lens 100, the camera body 200 is provided with an electrical contact 214a (e.g., for the clock signal), a contact 214b (e.g., for the transmission of a signal from the camera body to the lens), and a contact 214c (e.g., for the transmission of a signal from the lens to the camera body), as well as a power supply contact 214d for supplying the power to the camera body 200, and a ground contact 214e.

Figure 2:
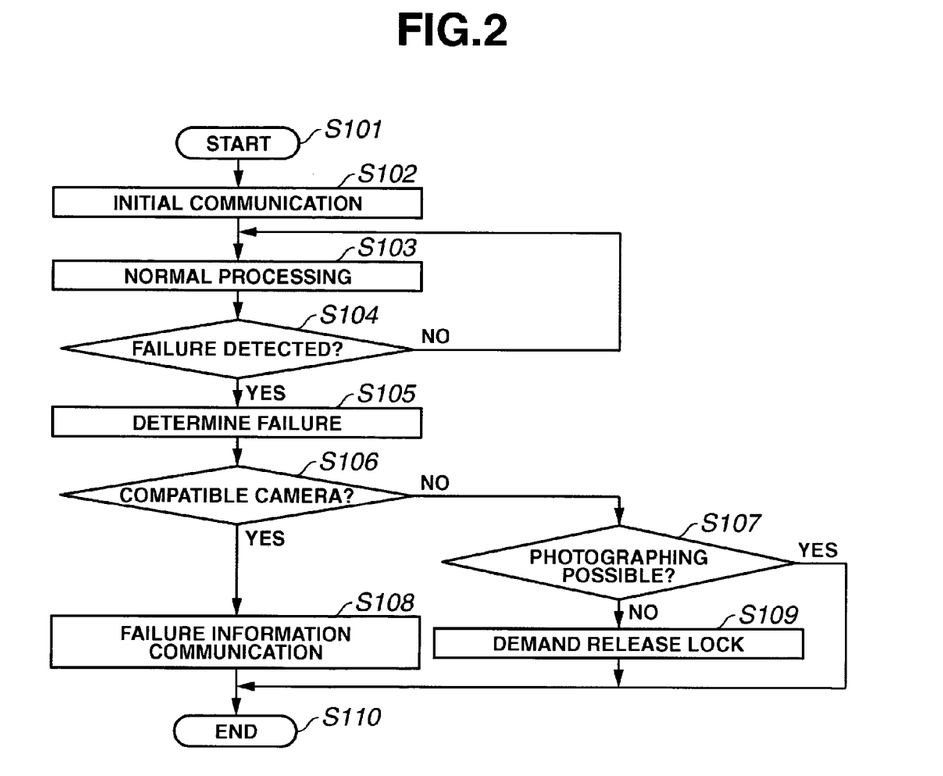
FIG. 2 is a flow chart showing a part of an operation of an interchangeable lens according to the camera system in FIG. 1.

FIG. 2 is a flow chart specifically showing an example of processing inside the lens microcomputer 102 in FIG. 1.

The processing is started from step S101 when a main switch (not shown) of the camera body 200 is turned on or the interchangeable lens 100 is mounted on the camera body 200. In step S101, the power supply to the interchangeable lens 100 can be started.

In step S102, an initial communication with the camera body 200 is performed.

The information transmitted from the camera body 200 in the initial communication includes information for determining the camera body. The information is stored for use in step S106 that is described below.

Next, the processing proceeds to step S103 to carry out a normal processing. The normal processing includes the communication with the camera body, and the driving of a focus system (e.g., focus element), a diaphragm system, and a camera-shake reduction system.

In step S104, it is determined whether a failure is detected. If the failure is detected, the processing proceeds to step S105. If no failure is detected, the processing returns to step S103 and the normal processing is continued.

In step S105, it is determined what type of failure was detected. That is, it is determined in what part of the device the failure has occurred and what degree of an influence the failure has on photographing. Then, the determination is stored as the information.

For example, the information to be stored can be a 1-byte (8-bit) data, where the first four digits of bit represent the failure part, and second four digits of bit represent the degree of the failure.

Next, the processing proceeds to step S106. In step S106, it is determined whether the camera can deal with the communication of the failure information.

If it is determined that the camera can deal with the failure information communication based on the information obtained from the camera body in the initial communication in step S102, the processing proceeds to step S108.

In step S108, a failure information communication is carried out in order to transmit to the camera body the information that is determined to be the failure information, which was stored in step S105.

If it is determined that the camera cannot deal with the failure information communication, the processing proceeds to step S107. In step S107, it is determined whether photographing is possible based on the failure information that is obtained in step S105. For example, photographing is possible in the case of a failure in which the driving speed of the focus adjusting lens has become remarkably slow relative to a predetermined target driving speed.

If photographing is possible, the processing proceeds to step S110 and the processing ends.

If it is determined that photographing is not possible, the processing proceeds to step S109 and transmits a release lock request to the camera body.

When the processing as described above is finished, the processing by the lens microcomputer 102 ends in step S110 according to at least one exemplary embodiment.

As described above, the interchangeable lens 100 can determine the type of the camera body. With respect to the camera that cannot deal with the failure information communication, the interchangeable lens 100 determines if the release lock request should be issued depending on the degree of the failure.

Therefore, even in a case where the interchangeable lens 100 is combined with the camera that cannot deal with the failure information communication, the release button is not locked if it is determined that the failure is a minor failure.

In addition, the degree of the failure which requires the release lock can be previously stored in a ROM in the lens microcomputer 102. Or otherwise, the degree of the failure may be stored in an EEPROM so that the user can change the degree later.

Figure 3:
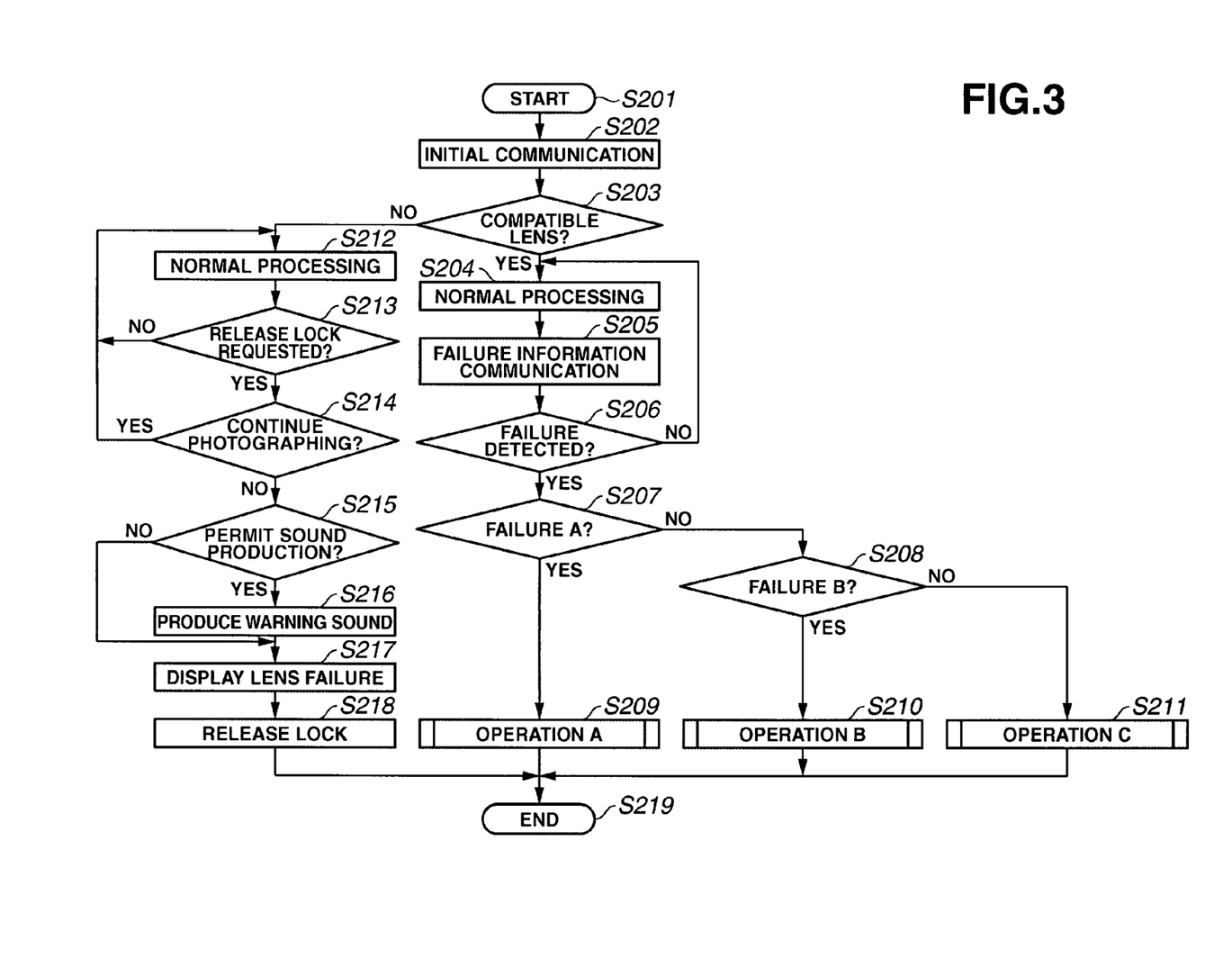
FIG. 3 is a flow chart showing a part of an operation of a camera body according to the camera system in FIG. 1.

Next, contents of the processing performed by the camera microcomputer 202 are described with reference to flow charts in FIGS. 3 through 8. First, the flow chart in FIG. 3 is described.

The processing is started from step S201 by turning on the main switch (not shown) of the camera body 200.

In step S202, an initial communication with the interchangeable lens 100 is performed.

The information transmitted from the interchangeable lens 100 in the initial communication includes information for determining a type of the interchangeable lens. The information is stored for use in a next step S203.

In step S203, it is determined whether the interchangeable lens 100 can deal with the failure information communication.

If it is determined that the interchangeable lens 100 can deal with the failure information communication based on the information stored in step S202, the processing proceeds to step S204 to perform the normal processing. If it is determined that the interchangeable lens 100 cannot deal with the failure information communication based on the information stored in step S202, the processing proceeds to step S212 to perform the normal processing.

The normal processing described here includes photometry, a distance measurement, a display, and a communication with the lens.

In FIG. 1, an automatic focusing (AF) and an exposure are performed in accordance with the state of the switch 211 (SW1) and the switch 212 (SW2). However, the details of this processing are omitted.

Next, the processing in steps S205 and below are described in the case where it is determined that the interchangeable lens 100 can deal with the failure information communication in step S203.

In step S205, the failure information communication is carried out in order to obtain the information of the failure of the lens. In step S206, it is determined whether the failure occurs in the lens (e.g., by a failure determination unit), based on the failure information obtained in step S205.

If it is determined that the failure occurs with respect to the lens, a degree and a type of the failure are determined in step S207 and below, and operations suitable to the degree and type of the failure are carried out.

If it is determined that no failure occurs with respect to the lens, the processing returns to step S204 and the normal operation continues.

The processing is described below in the case where it is determined that the failure occurs in the lens.

In step S207, it is determined that a type of the failure is a failure A based on the failure information. If the type is the failure A, the processing proceeds to step S209 and a processing operation suitable to the failure A is carried out.

If it is determined that the failure is other than the failure A, the processing proceeds to step S208. In step S208, it is determined whether the failure is a failure B.

If the type of the failure is the failure B, the processing proceeds to step S210 and a processing operation suitable to the failure B is carried out. If the type of the failure is not the failure B, it is determined that a failure C occurs, and then, in step S211, a processing suitable to the failure C is carried out. This procedure can be carried out further in a similar manner if there are more than three types of failure.

As described above, the processing is carried out in accordance with the type of the failure, and the processing by the camera microcomputer 202 comes to an end.

Next, the processing in step S213 and below is described in the case where it is determined that the lens cannot deal with the failure information communication.

In step S213, the communication with the interchangeable lens 100 is attempted, and it is determined whether the release lock is requested.

If the release lock is requested, the processing proceeds to step S214. If the release lock is not requested, the processing returns to step S212 and the normal processing is carried out.

In step S214, it is determined whether photographing should be continued according to the setting made by the user when the failure occurs with respect to the lens.

If the setting is made by the user to continue photographing, the processing returns to step S212 and the normal processing is carried out so that the camera operates to continue photographing.

If the setting is made by the user to prohibit photographing, the processing proceeds to step S215.

In step S215, it is determined whether a sound production by a sound production section is permitted by the user's setting.

If the sound production is permitted, the processing proceeds to step S216 to produce a warning sound. If the sound production is prohibited, the sound is not produced and the processing proceeds to step S217.

The warning sound in step S216 can be produced for a specific time period that is previously determined, or the sound production can be continued until the user performs a specific operation.

In step S217, a message indicating that the failure occurs to the lens is displayed by a display section. In step S218, the release button is locked, and in step S219, the processing comes to an end.

A part of the processing performed by the camera microcomputer 202 has been described above.

With respect to the camera body 200, a type of the mounted interchangeable lens 100 is recognized and the operation can be switched accordingly in the case of the failure. Thus, it is possible to carry out a separate and independent processing for each of the failures in the case of the lens 100 that can deal with the failure information communication.

In the case of the interchangeable lens 100 that cannot deal with the failure information communication, the user can select the operation performed by the camera responsive to the release lock request from the interchangeable lens 100. Accordingly, also in this case, it is possible to continue photographing.

Next, description is given as to each operation in the camera side when the failure occurs in the interchangeable lens 100.

Figure 4:
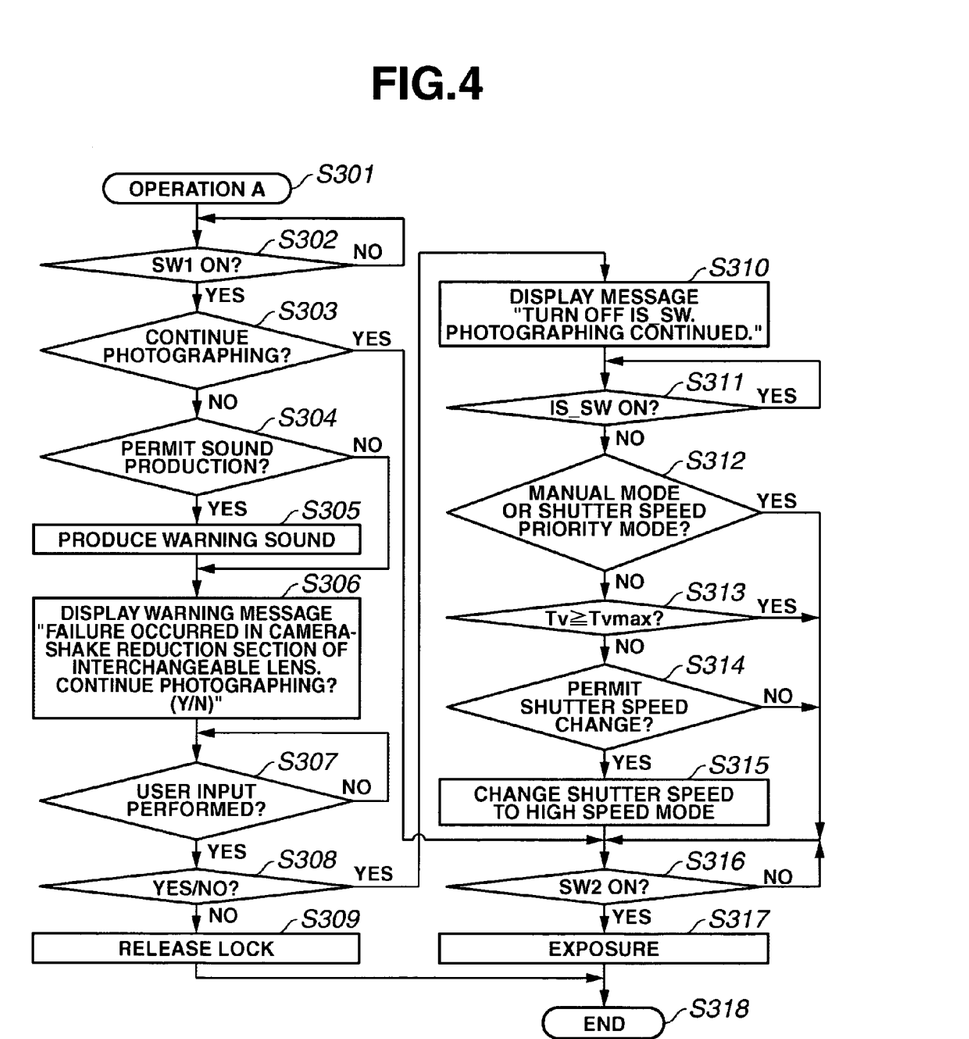
FIG. 4 is a flow chart showing an operation A in FIG. 3.

First, the operation A in FIG. 3 is described in detail with reference to the flow chart in FIG. 4.

In this exemplary embodiment, the failure A is related to the camera-shake reduction system 109 in FIG. 1.

The processing related to an operation A is started from step S301. In step S302, it is determined whether the switch 211 (SW1) is turned on. If it is determined that the switch 211 is turned on, the processing proceeds to step S303. If the switch 211 is turned off, the processing waits until the switch 211 is turned on.

In step S303, it is determined whether the setting is performed by the user such that photographing should be continued in the case of the failure A of the lens.

If the setting is performed such that photographing should be continued, the processing proceeds to step S316 and waits until the switch 212 (SW2) in FIG. 1 is turned on.

In this case, a message indicating that the failure has occurred to the camera-shake reduction system can be displayed by the display section 208 in a manner that does not hinder photographing.

If the setting is performed such that photographing should be prohibited, the processing proceeds to step S304 and it is determined whether the setting is performed by the user to permit the sound production.

If it is determined that the sound production is permitted, the warning sound is produced in step S305. If the sound production is prohibited, the sound is not produced and the processing proceeds to step S306.

The warning sound in step S305 can be produced for a specific time period that is previously determined, or can be continued until the user performs a specific operation.

In step S306, for example, a warning message can be sent (e.g., by a failure information transmission unit) indicating that "FAILURE OCCURRED IN CAMERA-SHAKE REDUCTION SECTION OF THE INTERCHANGEABLE LENS. CONTINUE PHOTOGRAPHING? (Y/N)", which can be displayed by the display section of the camera.

The message can notify the user of the failure in the camera-shake section of the lens and ask the user whether to continue photographing. The actual composition of the message itself can be different from the message as described in this exemplary embodiment.

In step S307, the processing waits until the user does input in response to the message displayed in step S306. When input is done by the user, the processing proceeds to step S308.

In step S308, it is determined whether the input done by the user is "Yes" or "No." If it is determined that the input by the user is "Yes", the processing proceeds to step S310.

If the input by the user is "No", the processing proceeds to step S309. In step S309, the release lock is carried out and the processing ends there.

In step S310, since the user has selected to continue photographing, the operation of the camera-shake reduction section where the failure has occurred is prohibited.

Accordingly, in a case where the image stabilization switch 113 (IS_SW) in FIG. 1 is turned on, a warning message, for example, "TURN OFF IS_SW. PHOTOGRAPHING CONTINUED", can be displayed by the display section.

After that, the processing waits until the image stabilization switch 113 is turned off in step S311.

The processing in step S312 and below prevents a photographed image from deteriorating due to the camera shake even when the camera-shake reduction section fails.

In step S312, it is determined whether an exposure mode is a manual mode or a shutter speed priority mode.

If the exposure mode is the manual or the shutter speed priority, no processing is carried out because the user intentionally selects the shutter speed. Accordingly, the processing proceeds to step S316 and waits until the SW2 is turned on.

If the exposure mode is neither manual nor the shutter speed priority, the processing proceeds to step S313. In step S313, a current shutter speed Tv and a camera-shake limited shutter speed Tvmax are compared.

The camera-shake limited shutter speed Tvmax is generally expressed as "1/current focal distance." However, it is not necessary to apply a value obtained by this expression and the camera-shake limited shutter speed Tvmax can be previously and independently determined. Further, the camera-shake limited shutter speed Tvmax can be changed in accordance with a dimension of the image pickup element.

If the current shutter speed Tv is higher than or equal to the camera-shake limited shutter speed Tvmax, the processing proceeds to step S316 with the current setting and waits until the SW2 is turned on.

If the current shutter speed Tv is lower than the camera-shake limited shutter speed Tvmax, the processing proceeds to step S314 to determine whether it is permitted to change the shutter speed according to the setting by the user.

If it is determined that the change of the shutter speed is not permitted, the processing proceeds to step S316, and if the change of the shutter speed is permitted, the processing proceeds to step S315, and the shutter speed is changed to a high speed mode.

In order to change the shutter speed to the high speed mode, there are methods such as "changing the diaphragm to a full aperture mode if the diaphragm is not in the full aperture mode", "shifting the setting of an ISO sensitivity to a more sensitive side", and "if a strobe is installed, allowing the strobe to flash."

In step S316, the processing waits until the SW2 (the switch 212) in FIG. 1 is turned on. If the SW2 is on, the processing proceeds to step S317 and carries out exposure and the processing ends in step S318.

The processing by the camera microcomputer 202 has been described above in the case of the failure of the camera-shake reduction system, namely, the failure A according to this exemplary embodiment.

As described above, the user can switch the processing in the case of the failure of the camera-shake reduction system 109 in the interchangeable lens 100. Thus, photographing can be continued even when the failure occurs to the camera-shake reduction system 109.

In addition, in order to continue photographing, the shutter speed can be controlled to shift to the high speed mode. Accordingly, it is possible to suppress the image deterioration due to the camera-shake to a minimum.

Further, if the setting is performed by the user to continue photographing even when the camera-shake reduction system fails, photographing can be continued without hindrance or suspension.

Therefore, an opportunity to shoot does not slip away.

Figure 5:
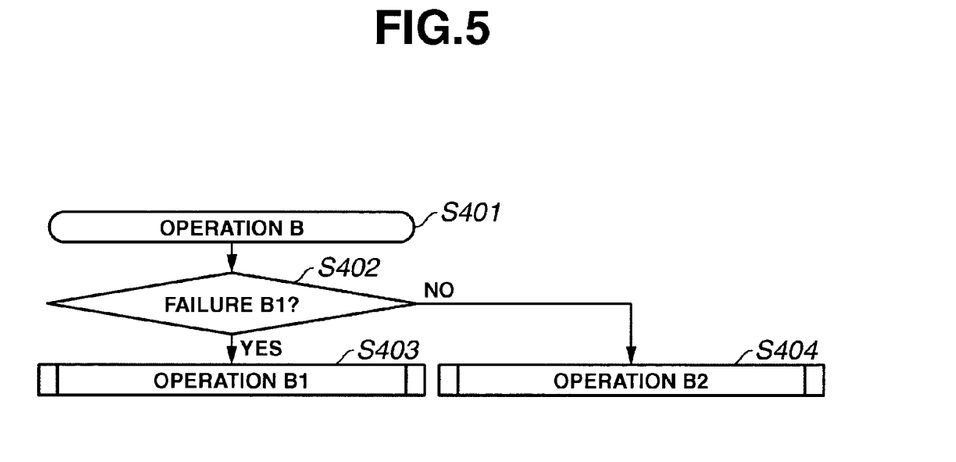
FIG. 5 is a flow chart showing an operation B in FIG. 3.

141 Next, the processing in the case of the failure B is described in detail with reference to the flow chart in FIG. 5. In this exemplary embodiment, the failure B is related to the diaphragm driving system 104.

If the failure B is confirmed in step S208 in FIG. 3, the processing proceeds to step S210. Main processing is started from step S401.

In step S402, it is determined whether a type of the failure is a failure B1.

Specifically, if the aperture of a diaphragm cannot be reduced, it is determined that the type of the failure is the failure B1, and the processing proceeds to step S403 to perform an operation B1. If the diaphragm cannot be returned to a full aperture state, it is determined that the type of the failure is a failure B2, and the processing executes an operation B2.

Figure 6:
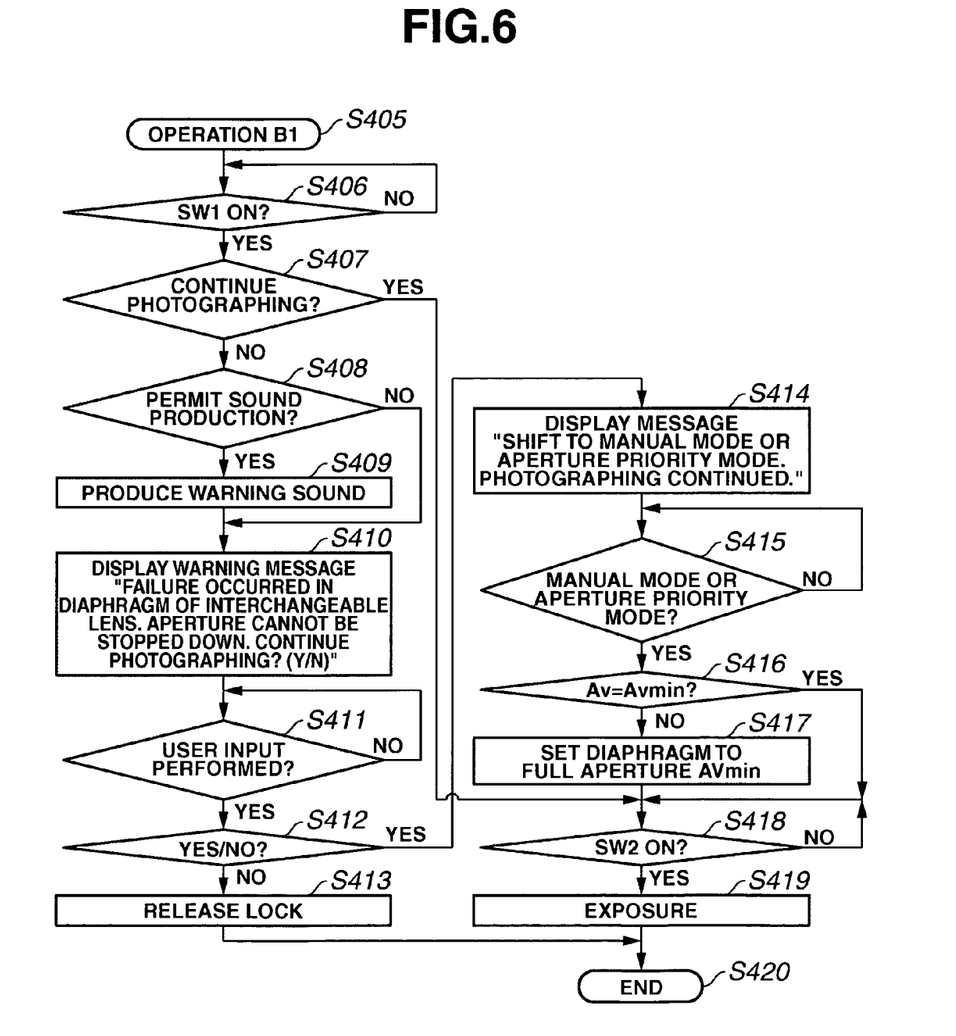
FIG. 6 is a flow chart showing an operation B1 in FIG. 5.

Next, the operation B1 is described in detail with reference to the flow chart in FIG. 6.

The processing is started from step S405. In step S406, it is determined whether the switch 211 (SW1) is turned on. If the switch 211 is turned on, the processing proceeds to step S407. If the switch 211 is turned off, the processing waits until the switch 211 is turned on. In step S407, it is determined whether the setting is performed by the user to continue photographing in the case of the failure B1 of the lens If the setting is performed to continue photographing, the processing proceeds to step S418. In step S418, the processing waits until the switch 212 (SW2) in FIG. 1 is turned on.

In this case, a message indicating that the failure has occurred to the diaphragm system may be displayed by the display section 208 in a manner that does not hinder photographing.

If the setting is performed to prohibit photographing, the processing proceeds to step S408 and it is determined whether the setting is performed by the user to permit the sound production.

If the sound production is permitted, the warning sound is produced instep S409. If the sound production is prohibited, the sound is not produced and the processing proceeds to step S410.

The warning sound in step S409 may be produced for a specific time period that is previously determined, or may be continued until the user performs a specific operation.

Instep S410, a message, for example, "FAILURE OCCURRED IN DIAPHRAGM OF THE INTERCHANGEABLE LENS. THE DIAPHRAGM CANNOT BE STOPPED DOWN. CONTINUE PHOTOGRAPHING? (Y/N)", can displayed by the display section of the camera.

The message can notify the user of the failure that the diaphragm of the lens cannot be stopped down and ask the user whether to continue photographing. The actual composition of the message itself can be different from the one as described in this exemplary embodiment.

In step S411, the processing waits until the user does input in response to the message displayed in step S410. When input is done by the user, the processing proceeds to step S412.

In step S412, it is determined whether the input by the user is "Yes" or "No." If the input by the user is "Yes", the processing proceeds to step S414. If the input by the user is "No", the processing proceeds to step S413. In step S413, the release lock is carried out and the processing ends there.

In step S414, since the user has selected to continue photographing, a photographing mode is selected that does not affect photographing much even in the case of the failure of the diaphragm. For that purpose, a warning message, for example, "SHIFT TO MANUAL MODE OR APERTURE PRIORITY MODE. PHOTOGRAPHING CONTINUED" is displayed. Then, the processing waits until the photographing mode is shifted to the manual mode or the aperture priority mode in step S415.

The processing carried out in step S416 and below enables photographing to continue and to reduce the influence of the failure on the photographed image even when the diaphragm fails to be stopped down.

In step S416, a current aperture setting value Av and a full aperture setting value Avmin are compared.

If the current aperture setting value is set to be other than Avmin, the processing proceeds to step S417 and the aperture is compulsorily set to the full aperture setting value Avmin.

In the aperture priority mode, the shutter speed is automatically determined and set in accordance with a result of photometry by a photometry section 204.

In the manual mode, exposure is obtained by combining the shutter speed set by the user with the full aperture setting value Avmin. An amount of deviation of the exposure from the result of the photometry obtained by the photometry section 204 is displayed by the display section 208.

In step S418, the processing waits until the switch 212 (SW2) in FIG. 1 is turned on. When the switch is turned on, the processing proceeds to step S419 to perform exposure, and then the processing ends in step S420.

Figure 7:
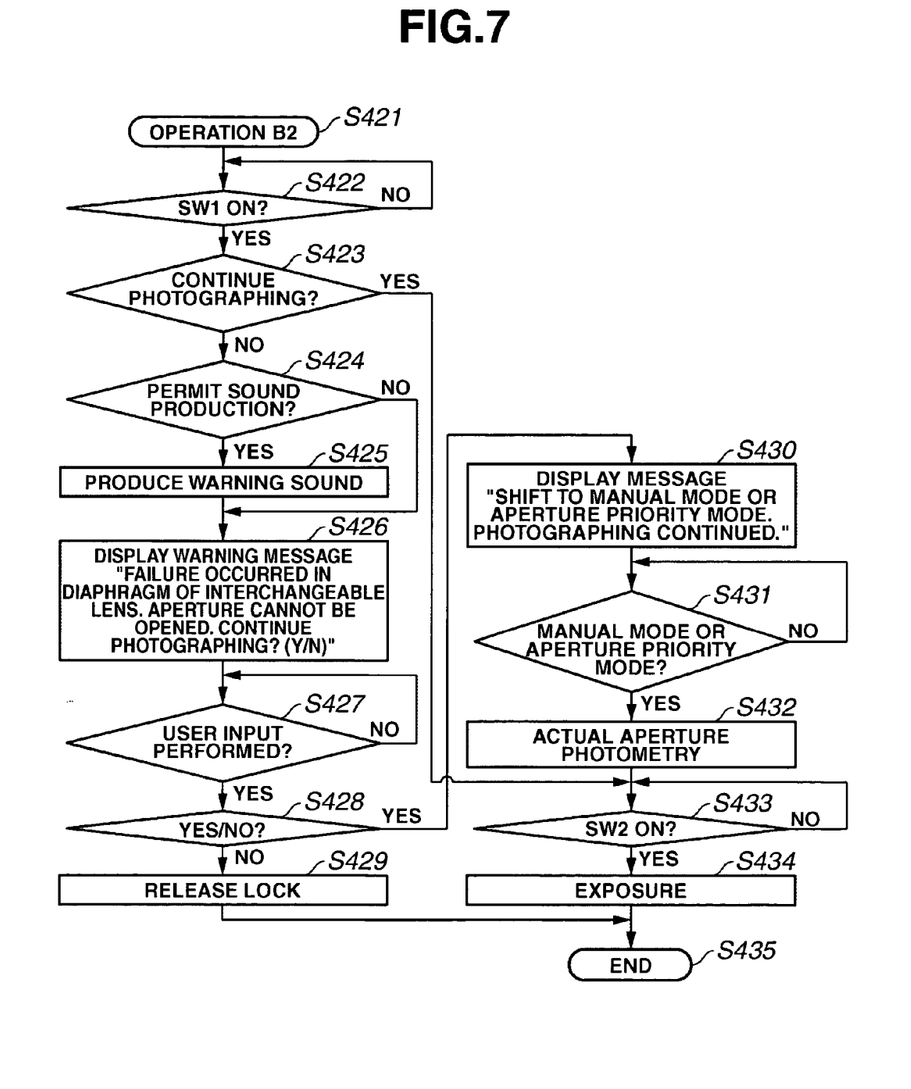
FIG. 7 is a flow chart showing an operation B2 in FIG. 5.

Next, the operation B2 is described in the case of the failure that the aperture cannot be fully opened, with reference to the flow chart in FIG. 7.

The processing is started from step S421. In step S422, it is determined whether the switch 211 (SW1) in FIG. 1 is turned on.

If the switch 211 (SW1) is turned on, the processing proceeds to step S423. If the switch 211 (SW1) is turned off, the processing waits until the switch 211 (SW1) is turned on. In step S423, it is determined whether the setting is performed by the user to continue photographing in the case of the failure B2 of the lens.

If the setting is performed by the user to continue photographing, the processing proceeds to step S433 and the processing waits until the switch 212 (SW2) in FIG. 1 is turned on.

In this case, a message indicating that the failure has occurred to the diaphragm can be displayed by the display section 208 in a manner that does not hinder photographing.

If the setting is performed by the user to prohibit photographing, the processing proceeds to step S424. In step S424, it is determined whether the setting is performed by the user to permit the sound production.

If the sound production is permitted, the warning sound is produced in step S425. If the sound production is prohibited, the sound is not produced and the processing proceeds to step S426.

The warning sound in step S425 can be produced for a specific time period that is previously determined, or can be continued until the user performs a specific operation.

In step S426, a message, for example, "FAILURE OCCURRED IN DIAPHRAGM OF THE INTERCHANGEABLE LENS. THE APERTURE CANNOT BE FULLY OPENED. CONTINUE PHOTOGRAPHING? (Y/N)" can be displayed by the display section of the camera.

The message can notify the user of the failure that the diaphragm of the lens cannot be fully opened and ask the user whether to continue photographing. The actual composition of the message can be different from the one as described in this exemplary embodiment.

In step S427, the processing waits until the user does input in response to the message displayed in step S426. When input is done by the user, the processing proceeds to step S428.

In step S428, it is determined whether the input by the user is "Yes" or "No." If the input by the user is "Yes", the processing proceeds to step S430. If the input by the user is "No", the processing proceeds to step S429. In step S429, the release lock is carried out and the processing ends there.

In step S430, since the user has selected to continue photographing, a photographing mode is selected that does not affect photographing much even when the diaphragm fails.

Accordingly, a warning message, for example, "SHIFT TO MANUAL MODE OR APERTURE PRIORITY MODE. PHOTOGRAPHING CONTINUED." can be displayed. Then, the processing waits until the photographing mode is shifted to the manual mode or the aperture priority mode in step S431.

The processing carried out in step S432 and below enable photographing to be continued and reduce the influence of the failure on the photographed image even when the diaphragm cannot be fully opened.

In step S432, an actual diaphragm photometry is carried out by the photometry section 204. This is because the current aperture setting is not necessarily a proper value due to the failure of the diaphragm.

In the aperture priority mode, the shutter speed is automatically determined and set in accordance with the result of the photometry.

In the manual mode, exposure is obtained by combining the shutter speed set by the user with the aperture setting value. An amount of deviation of exposure from the result of the photometry by the photometry section 204 can be displayed by the display section 208.

In step S433, the processing waits until the switch 212 (SW2) in FIG. 1 is turned on. If the switch is turned on, the processing proceeds to step S434 to carry out the exposure, and then the processing ends in step S435.

The processing performed by the camera microcomputer 202 is described above in the case of the failure B1 and B2 of the diaphragm system according to this exemplary embodiment.

According to the above description, the user can switch the processing in the case of the failure of the diaphragm system of the interchangeable lens 100 so that photographing can be continued even when the failure occurs to the diaphragm system.

In addition, when photographing is continued, the exposure can be performed with an optimized exposure value by restricting the photographing mode and switching the photometry mode.

Further, when the setting is performed by the user to continue photographing even when the diaphragm system fails, photographing can be continued without hindrance or suspension.

Figure 8:
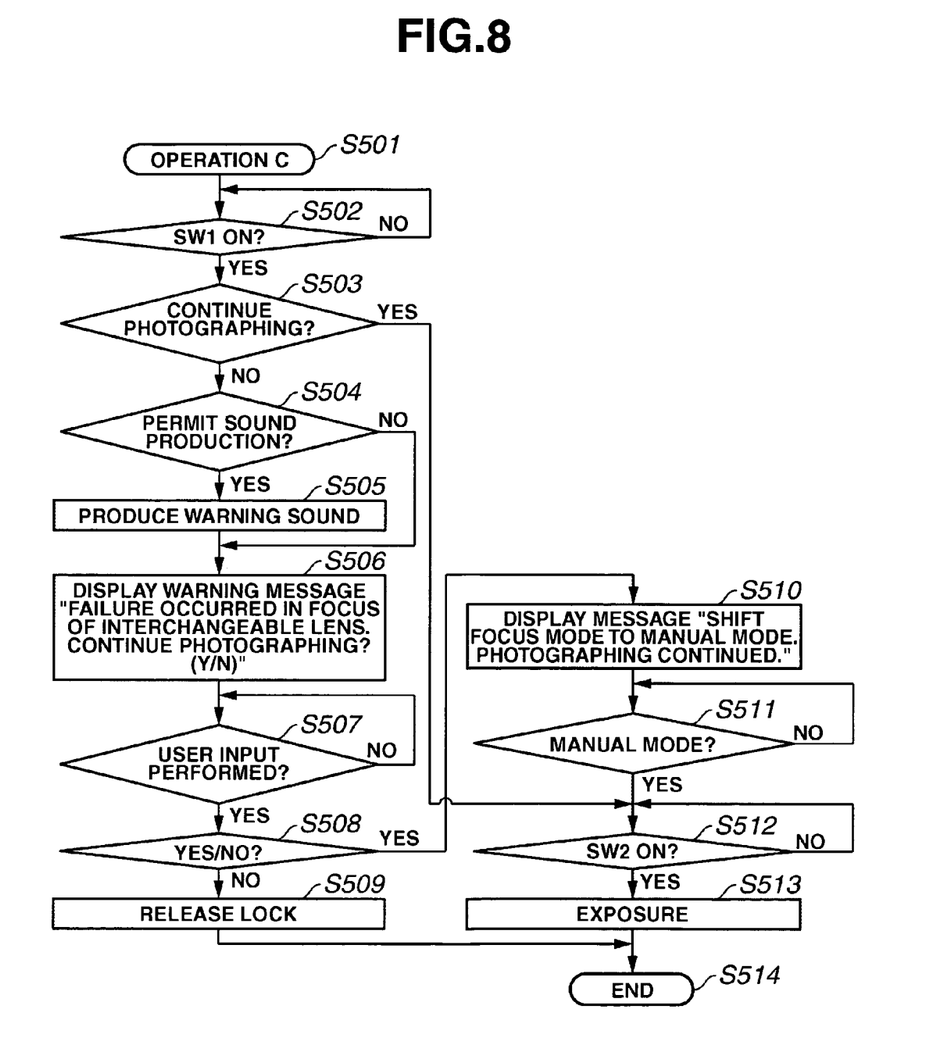
FIG. 8 is a flow chart showing an operation C in FIG. 3.

Next, the processing in the case of the failure C is described in detail with reference to the flow chart in FIG. 8.

In this exemplary embodiment, the failure C is related to the focusing system 103.

The processing related to an operation C is started from step S501. In step S502, it is determined whether the switch 211 (SW1) in FIG. 1 is turned on.

If the switch 211 (SW1) is turned on, the processing proceeds to step S503. If the switch 211 (SW1) is turned off, the processing waits until the switch 211 (SW1) is turned on. In step S503, it is determined whether the setting is performed by the user to continue photographing in the case of the failure C of the lens.

If the setting is performed to continue photographing, the processing proceeds to step S512 and waits until the switch 212 (SW2) in FIG. 1 is turned on.

In this case, a message indicating that the failure has occurred to the focusing system can be displayed by the display section 208 in a manner that does not hinder photographing.

If the setting is performed by the user to prohibit photographing, the processing proceeds to step S504. In step S504, it is determined whether the setting is performed by the user to permit the sound production.

If the sound production is permitted, the warning sound is produced in step S505. If the sound production is prohibited, the sound is not produced and the processing proceeds to step S506.

The warning sound in step S505 can be produced for a specific time period that is previously determined, or can be continued until the user performs a specific operation.

In step S506, for example, a message indicating that "FAILURE OCCURRED IN THE FOCUS OF THE INTERCHANGEABLE LENS. CONTINUE PHOTOGRAPHING? (Y/N)" can be displayed by the display section of the camera.

In step S507, the processing waits until the user does input in response to the message displayed in step S506. When input is done by the user, the processing proceeds to step S508.

In step S508, it is determined whether the input by the user is "Yes" or "No." If the input by the user is "Yes", the processing proceeds to step S510. If the input by the user is "No", the processing proceeds to step S509. In step S509, the release lock is carried out and the processing ends there.

In step S510, since the user has selected to continue photographing, the operation of the focusing section which has failed is prohibited. In that case, a warning message, for example, "SHIFT FOCUS MODE TO MANUAL MODE. PHOTOGRAPHING CONTINUED." can be displayed if the AUTO/MANUAL switching switch 114 (A/M_SW) in FIG. 1 is set to the automatic mode (AUTO). Then, the processing waits until the switch 114 (A/M_SW) is switched to the manual mode in step S511. In step S512, the processing waits until the switch 212 (SW2) in FIG. 1 is turned on. When the switch 212 (SW2) is turned on, the processing proceeds to step S513. In step S513, the exposure is carried out, and then in step S514, the processing comes to an end.

The processing performed by the camera microcomputer 202 is described above in the case of the failure C of the focusing system according to this exemplary embodiment.

According to the above description, the user can switch the processing in the case of the failure of the focusing system of the interchangeable lens 100 so that photographing can be continued even when the failure occurs to the focusing system.

In addition, when photographing is continued, an out-of-focus picture due to the failure in the focusing system can be prevented by restricting the focusing mode to the manual mode.

Further, if the setting is performed by the user to continue photographing even when the focusing system fails, photographing can be continued without hindrance or suspension.

As described above, the operation inside the camera is changed in accordance with the failure of the interchangeable lens. Accordingly, the camera body according to this exemplary embodiment is configured to suppress the effect of the failure of the interchangeable lens on photographing.

Further, since the user can set the operation for dealing with each failure, it is possible to manage the failure of the interchangeable lens reflecting a desire of the user. The above discussed processes can be performed by dedicated units within the interchangeable lens and the camera body. For example, in the camera body a communication unit can be configured to communicate with an attached interchangeable lens (e.g., 214a, 214b, 214c, 214d, 214e). The information can be used by an interchangeable lens determination unit configured to determine a type of the interchangeable lens based on information obtained by the communication with the interchangeable lens, for example by comparing the received information with a stored table listing ID values versus interchangeable lens types. Additionally the camera body can include a failure information receiving unit configured to receive failure information of the interchangeable lens transmitted from the interchangeable lens (e.g., through one of the data ports e.g., 115a) where the information from the interchangeable lens may or may not be received depending upon the type of interchangeable lens determined by the interchangeable lens determination unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-020618 filed Jan. 28, 2005, which is hereby incorporated by reference herein in its entirety.

What is claimed is:

1. A camera body to which a plurality of types of lenses can be interchangeably connected, the camera body comprising:
    a communication unit configured to communicate with an interchangeable lens;
    an interchangeable lens determination unit configured to determine a type of the interchangeable lens based on information obtained by the communication with the interchangeable lens;
    a failure information receiving unit configured to receive failure information of the interchangeable lens transmitted from the interchangeable lens, wherein it is determined whether the failure information is received based on a result of determination by the interchangeable lens determination unit; and
    a unit configured to allow the user to set or select an operation in accordance with the failure information received from the interchangeable lens.

2. A method of continuing photographing during an identified failure comprising:
    communicating between an interchangeable lens and a camera body to determine whether failure information can be interchanged;
    determining the type of failure that has occurred if failure information can be interchanged between the camera body and the interchangeable lens;
    continuing to photograph if there is a setting that has been predetermined so as to allow photography to continue for the type of failure; and
    sending a warning to a user if the setting does not allow photography to continue for the type of failure.

3. The method according to claim 2, wherein the type of failure is a failure of a camera shake reduction system.

4. The method according to claim 2, wherein the type of failure is a failure of a diaphragm system.

5. The method according to claim 2, wherein the type of failure is a failure of focusing in the interchangeable lens.

* * * * *